(12) United States Patent
Koefoed et al.

(10) Patent No.: US 10,850,453 B2
(45) Date of Patent: Dec. 1, 2020

(54) HYBRID MATERIAL MAT

(71) Applicant: LM WP PATENT HOLDING A/S, Kolding (DK)

(72) Inventors: Michael Scholearth Koefoed, Vejen (DK); Flemming Kiel Sorensen, Vamdrup (DK); Kim Ansholm Rasmussen, Kolding (DK); Klavs Jespersen, Kolding (DK); Morten Olesen, Lunderskov (DK)

(73) Assignee: LM WP PATENT HOLDING A/S, Kolding (DK)

( * ) Notice: Subject to any disclaimer, the term of this patent is extended or adjusted under 35 U.S.C. 154(b) by 405 days.

(21) Appl. No.: 14/903,868

(22) PCT Filed: Jul. 22, 2014

(86) PCT No.: PCT/EP2014/065713
§ 371 (c)(1),
(2) Date: Jan. 8, 2016

(87) PCT Pub. No.: WO2015/011137
PCT Pub. Date: Jan. 29, 2015

(65) Prior Publication Data
US 2016/0221272 A1 Aug. 4, 2016

(30) Foreign Application Priority Data
Jul. 26, 2013 (EP) ..................................... 13178126

(51) Int. Cl.
*B29C 70/88* (2006.01)
*B29C 70/02* (2006.01)
(Continued)

(52) U.S. Cl.
CPC .............. *B29C 70/02* (2013.01); *B29C 70/20* (2013.01); *B29C 70/46* (2013.01); *B29C 70/882* (2013.01);
(Continued)

(58) Field of Classification Search
CPC ......... B29C 70/02; B29C 70/882; B32B 5/26; B32B 5/12
See application file for complete search history.

(56) References Cited

U.S. PATENT DOCUMENTS

2002/0123287 A1  9/2002 Davies et al.
2004/0213952 A1* 10/2004 Takemura ............... B29C 70/34
                                                   428/105
(Continued)

FOREIGN PATENT DOCUMENTS

EP      0 436 391 A2    7/1991
WO      2012/075282     6/2012

OTHER PUBLICATIONS

Hanssen, Carbon Fiber Lay-ups, 2009, Stratasys, Inc., p. 1-2 (Year: 2009).*

(Continued)

*Primary Examiner* — Matthew J Daniels
*Assistant Examiner* — Andrew L Swanson
(74) *Attorney, Agent, or Firm* — Nath, Goldberg & Meyer; Jerald L. Meyer; Tanya E. Harkins

(57) ABSTRACT

A hybrid material mat for use in the manufacture of fibre-composite articles, in particular parts for wind turbine blades, is described. The mat comprises a plurality of glass fibre rovings provided on top of a relatively thin planar substrate of carbon fibres. Such a hybrid mat construction provides for an improvement in the structural properties of (Continued)

a component manufactured using the mat, as well as allowing for ease of handling and manufacturing of both the mat itself and the component.

12 Claims, 5 Drawing Sheets

(51) Int. Cl.
B32B 5/26 (2006.01)
B29D 99/00 (2010.01)
B29C 70/20 (2006.01)
F03D 1/06 (2006.01)
F03D 80/30 (2016.01)
B29C 70/46 (2006.01)
B29K 105/08 (2006.01)
B29K 307/04 (2006.01)
B29K 309/08 (2006.01)
B29L 31/08 (2006.01)

(52) U.S. Cl.
CPC ............ *B29D 99/0025* (2013.01); *B32B 5/26* (2013.01); *F03D 1/0675* (2013.01); *F03D 80/30* (2016.05); *B29C 70/88* (2013.01); *B29K 2105/0809* (2013.01); *B29K 2307/04* (2013.01); *B29K 2309/08* (2013.01); *B29K 2995/0005* (2013.01); *B29L 2031/085* (2013.01); *B32B 2260/021* (2013.01); *B32B 2260/046* (2013.01); *B32B 2262/101* (2013.01); *B32B 2262/106* (2013.01); *Y02E 10/72* (2013.01); *Y02P 70/50* (2015.11)

(56) References Cited

U.S. PATENT DOCUMENTS

| | | | |
|---|---|---|---|
| 2006/0089068 A1* | 4/2006 | Hartman | B32B 5/12 442/172 |
| 2006/0280613 A1* | 12/2006 | Hansen | H02G 13/00 416/230 |
| 2010/0104447 A1 | 4/2010 | Eyb | |
| 2011/0243750 A1* | 10/2011 | Gruhn | B29B 11/16 416/226 |
| 2012/0177872 A1* | 7/2012 | Tsai | B29C 70/202 428/113 |

OTHER PUBLICATIONS

Koussios, Filament Winding: Design, Materials, Structures and Manufacturing Processes, 2012, Wiley Encyclopedia of Composites, Second Edition, pp. 2 and 4 (Year: 2012).*

* cited by examiner

HYBRID MATERIAL MAT

This is a National Phase Application filed under 35 U.S.C. 371 as a national stage of PCT/EP2014/065713, filed Jul. 22, 2014, an application claiming the benefit of European Application No. 13178126.2, filed Jul. 26, 2013, the content of each of which is hereby incorporated by reference in its entirety.

FIELD OF THE INVENTION

The present invention relates to a hybrid material mat for use in the manufacture of a fibre-composite article such as a wind turbine blade, a method of manufacturing such a mat, a method of manufacturing a fibre-composite article using such a mat, and a fibre-composite article incorporating such a mat, for example a wind turbine blade.

BACKGROUND OF THE INVENTION

Fibre-composite articles, such as wind turbine blades, are generally formed by the initial layup of several layers of fibres in a shaped mould, the fibres subsequently infused with a resin which is cured. Accordingly, this forms a structure of layers of fibres suspended in a matrix of cured resin. Such manufacturing methods result in structures which are relatively light-weight, and structurally strong. The selection of the particular fibres used in the manufacture can determine the ultimate structural performance of the article.

Traditionally, glass fibres have been used in fibre-composite manufacture, but use of carbon fibres for wind turbine blade manufacture is of increasing interest, due to the increased stiffness of carbon fibres compared to glass fibres. However, carbon fibres are considerably more expensive than glass fibres.

U.S. Pat. No. 7,758,313 discloses a method of manufacturing a spar cap for a wind turbine blade, where the spar cap is formed from a mixture of carbon and glass fibres, thereby providing a hybrid effect of increased component stiffness, with reduced cost compared to a pure carbon blade.

U.S. Pat. No. 7,758,313 discloses a first embodiment wherein glass fibres and carbon fibres are evenly mixed within a common matrix. This approach presents considerable manufacturing difficulties, as the accurate even distribution of carbon and glass fibres requires the use of precise handling equipment to position the fibres to ensure adequate process control.

U.S. Pat. No. 7,758,313 discloses a second embodiment wherein layers of glass fibres and layers of carbon fibres are alternately laid up in a mould, and then infused with a matrix material. This approach results in easier provision of material than the first embodiment. However, the application of layers of two different materials into the mould requires the use of two separate applicator machines, or at least two separate application procedures during the manufacturing process, receiving the layers from separate material sources, thereby increasing the time and/or expense involved in the manufacturing process.

With reference to FIG. 5, it is also known to provide "in-ply" hybrid material 100, wherein the layer of material 100 is provided by an array of glass fibre rovings 102, with carbon fibre tows 104 positioned at spaced locations within the array among the glass fibre rovings 102. While such constructions perform relatively adequately, additional measures have to be taken to ensure potential equalisation of the conductive carbon fibres located in the material, as well as introducing further complications to handling and manufacturing processes.

It is an object of the invention to provide a material for the manufacture of a fibre-composite article, in particular a wind turbine blade, which eliminates the above problems, and provides for ease of manufacture of the material itself and of the article.

SUMMARY OF THE INVENTION

Accordingly, there is provided a hybrid material mat for use in the manufacture of a fibre-composite article such as a wind turbine blade, the hybrid material mat comprising a plurality of glass fibre rovings provided on a carbon fibre substrate.

By providing a single mat or material layer having a combination of glass and carbon fibres, this allows for ease of handling and lay-up for the manufacture of fibre-composite articles. Such an arrangement of glass fibre rovings on a carbon fibre substrate provides improved performance over the prior art, with testing showing that the above structure provides 140% compressive strength, when compared with the performance of traditional in-ply hybrid materials. Furthermore, the provision of the glass fibre rovings on top of a thin carbon fibre layer allows for ease of manufacture of the material mat.

It will be understood that the hybrid material mat is preferably provided as a dry fibre mat.

It will be understood that said carbon fibre substrate is a planar layer of carbon fibres. In one aspect, said carbon fibre substrate is formed by at least one carbon fibre tow flattened or elongated into a relatively thin layer.

Preferably, the hybrid material mat is provided as a flexible material layer, preferably wherein the thickness ratio of the carbon fibre substrate to the plurality of glass fibre rovings is approximately 1:10. In one aspect, the carbon fibre substrate is approximately 0.1 mm thick, with the glass fibre rovings having a thickness or diameter of approximately 1 mm. The hybrid material mat itself has a thickness of between approximately 0.9-1.2 mm, preferably approximately 1-1.1 mm.

Preferably, said plurality of glass fibre rovings are arranged as a series of parallel longitudinally-extending rovings positioned on top of said carbon fibre substrate. Preferably, said carbon fibre substrate comprises a layer of longitudinally-extending carbon fibres.

In one aspect, said plurality of glass fibre rovings are provided on a first side of said hybrid material mat, and said carbon fibre substrate is provided on a second side of said hybrid material mat, wherein at least one carbon fibre tow is positioned among said plurality of glass fibre rovings on top of said carbon fibre substrate, said at least one carbon fibre tow providing for a potential equalization between said first side and said second side of said hybrid material mat.

In order to provide a conductive path between the carbon fibre substrates in a stack of said hybrid mats, a small number of carbon fibre tows may be positioned in the layer of glass fibre rovings, to provide conductive material on said first side of said mats.

Preferably, at least one carbon fibre tow is positioned among said plurality of glass fibre rovings, such that the ratio of carbon fibre tows to glass fibre rovings in said hybrid material mat is between approximately 1:50-1:100, preferably approximately 1:80.

In one embodiment, a carbon fibre tow having a diameter or thickness of approximately 1-2 mm is provided for approximately every 80 mm of glass fibre rovings.

Preferably, said hybrid material mat is provided as a roll of flexible fabric material.

Providing the material mats as flexible material allows for the hybrid material to be stored as rolls of fabric material, for ease of handling and storage.

Preferably, said hybrid material mat further comprises a stitching material, said plurality of glass fibre rovings stitched to said carbon fibre substrate using said stitching material.

The stitching material may be any suitable fibre material, used to retain the glass fibre rovings and said carbon fibre substrate into a single mat.

There is also provided a method of manufacturing a hybrid material mat, the method comprising the steps of:

compressing at least one carbon fibre tow to form a flattened carbon fibre substrate; and attaching a plurality of glass fibre rovings to said carbon fibre substrate to form a hybrid material mat.

The structure of the hybrid material mat allows for ease of manufacturing of the mat itself, being formed from a relatively simple process step for the attachment of the glass fibre rovings to the carbon fibre substrate.

Preferably, said step of attaching comprising stitching said plurality of glass fibre rovings to said carbon fibre substrate.

Preferably, said step of compressing comprises dividing said at least one carbon fibre tow into a plurality of separate tow portions, and flattening said plurality of separate tow portions to form a flattened substrate layer.

There is further provided a method of manufacturing at least part of a fibre-composite article, preferably at least part of a wind turbine blade, the method comprising:

providing a hybrid material mat comprising a plurality of glass fibre rovings provided on a carbon fibre substrate, said plurality of glass fibre rovings arranged on a first side of said hybrid material mat and said carbon fibre substrate arranged on a second side of said hybrid material mat;

arranging a plurality of said hybrid material mat in a mould;

infusing said plurality of hybrid material mat with a resin; and curing said resin to form at least part of a fibre-composite article, preferably at least part of a wind turbine blade.

Preferably, said step of arranging comprises positioning a plurality of hybrid material mats such that a plurality of said hybrid material mats at least partially overlap in a stack.

In one aspect, the method comprises the step of providing said hybrid material mat having at least one carbon fibre tow positioned among said plurality of glass fibre rovings on said carbon fibre substrate, wherein said at least one carbon fibre tow provides for a potential equalization between said first side and said second side of said hybrid material mat.

In an additional or alternative aspect, said step of arranging comprises:

positioning said plurality of said hybrid material mats in said mould, wherein said first side of said hybrid material mats are arranged face-down in the mould;

arranging said stack of at least partially overlapping mats of hybrid material wherein, at an edge of said stack, the end points of a plurality of mats in said stack are staggered such that at least a portion of said second side of the plurality of mats in said stack are exposed; and positioning a conductive material at the edge of said stack, said conductive material extending between the exposed portions of said plurality of mats in said stack, such that said conductive material provides a potential equalization between said plurality of mats of hybrid material in said stack.

As an alternative approach to provide for potential equalisation of the layers of the hybrid material mats, the mats can be positioned to present a portion of each carbon fibre substrate present in the stack of mats. Such portions can then be conductively coupled to each other to provide for equalisation of the potential between each substrate.

Preferably, said conductive material is provided as a layer of carbon fibre material. Additionally or alternatively, said conductive material may comprise a metallic conductor.

Preferably, said hybrid material mats are provided with a primary fibre orientation, and wherein said step of arranging said hybrid material mats in said mould comprises aligning the mats such that the primary fibre orientation of said mats is substantially parallel with the longitudinal direction of the part of a wind turbine blade.

There is further provided a part of a wind turbine blade manufactured according to the above method.

There is further provided the use of a hybrid material mat comprising a plurality of glass fibre rovings provided on a carbon fibre substrate in the manufacture of a wind turbine blade, preferably in the manufacture of a structural laminate of a wind turbine blade.

DESCRIPTION OF THE INVENTION

Embodiments of the invention will now be described, by way of example only, with reference to the accompanying drawings, in which.

Figure 1:
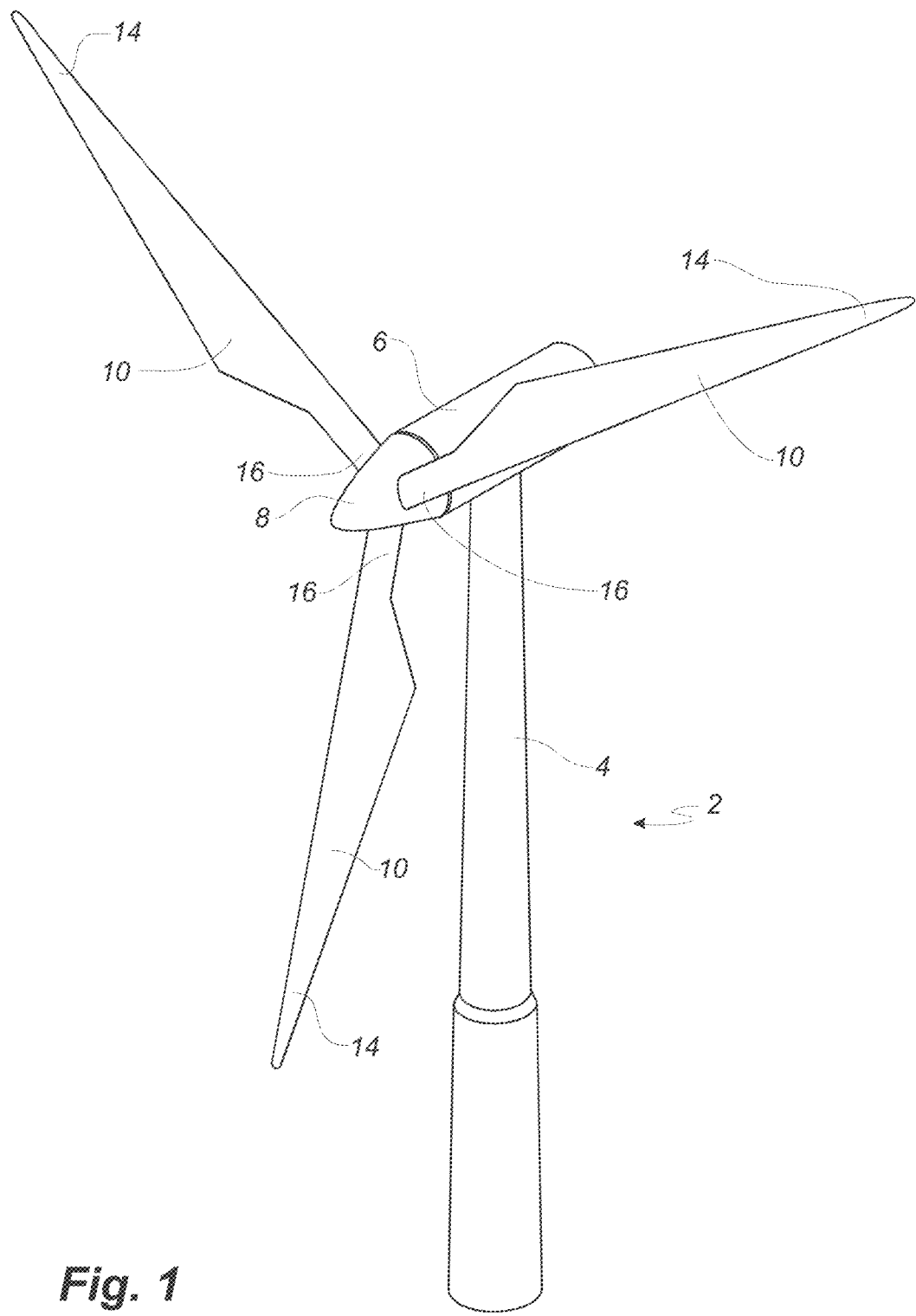
FIG. 1 shows a wind turbine having a plurality of wind turbine blades.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
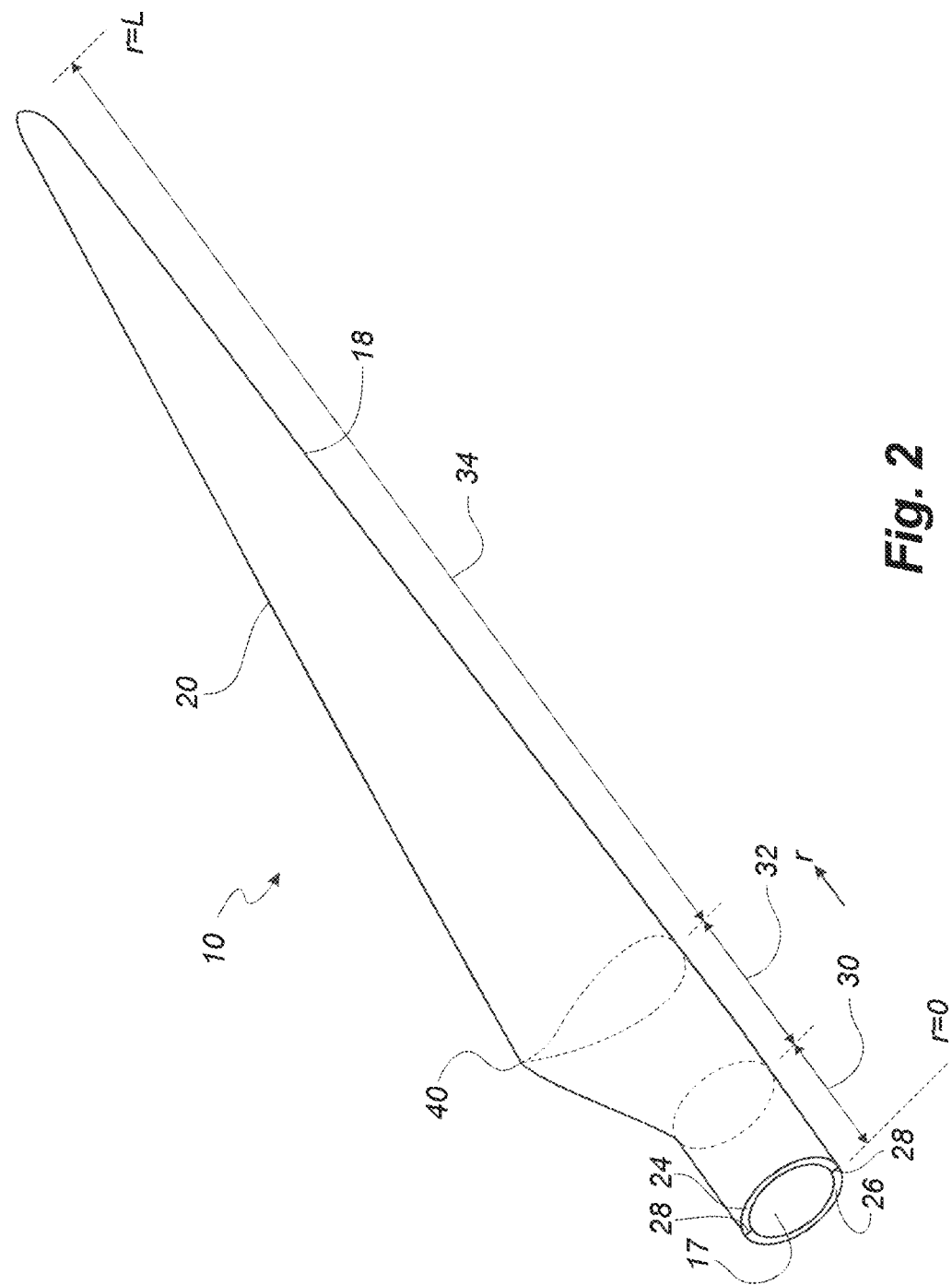
FIG. 2 shows a perspective view of a blade of the wind turbine of FIG. 1.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile gradually changing from the circular or elliptical shape 40 of the root region 30 to the airfoil profile 50 of the airfoil region 34. The chord length of the transition region 32 typically increases substantially linearly with increasing distance r from the hub.

Figure 3:
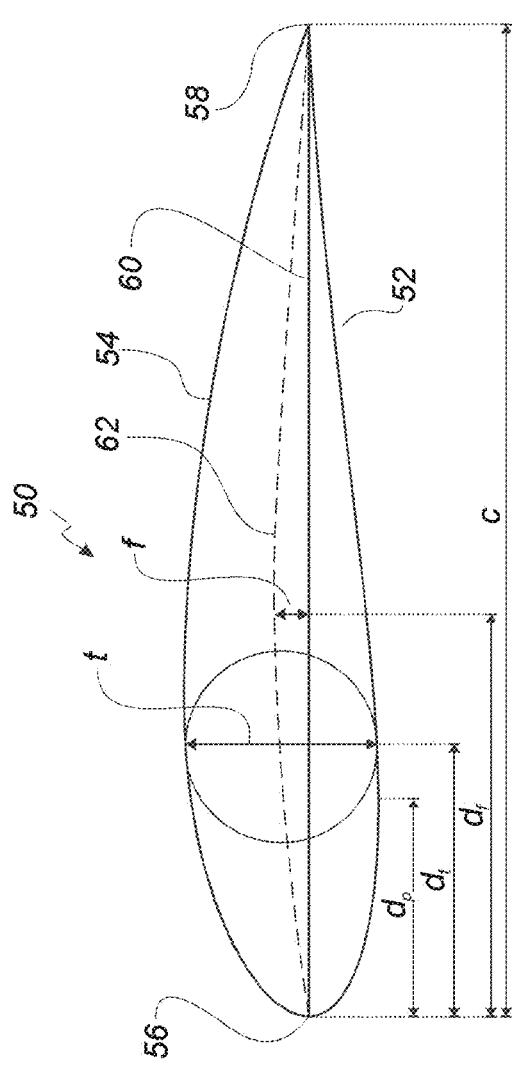
FIG. 3 shows a schematic view of an airfoil profile of the blade of FIG. 2.

The airfoil region 34 has an airfoil profile 50, FIG. 3, with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
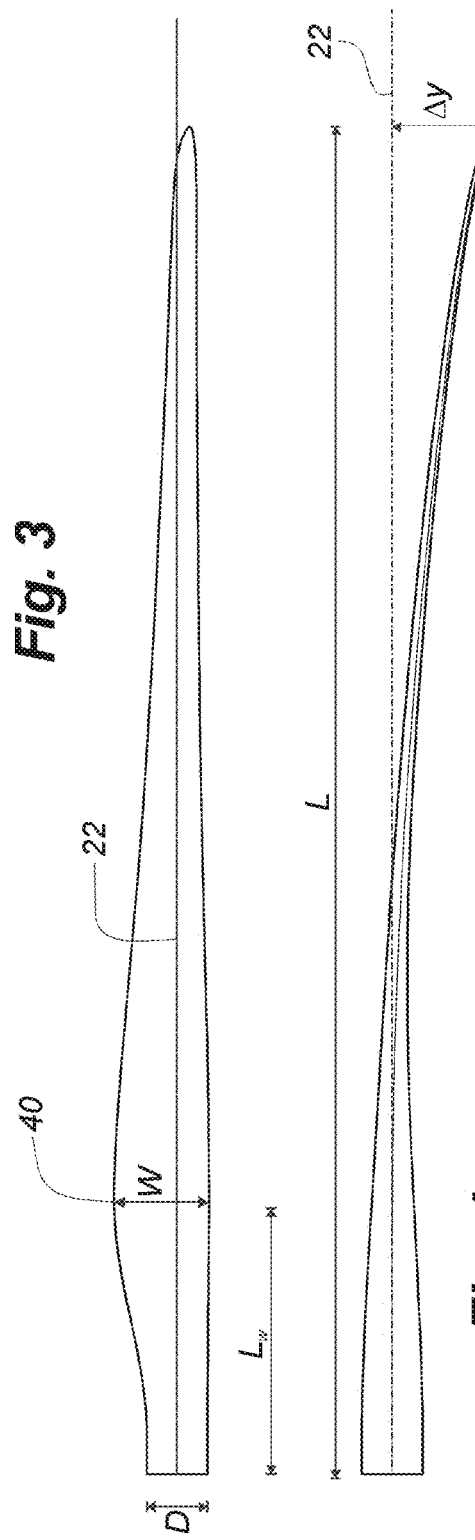
FIG. 4 shows a schematic view of the wind turbine blade of FIG. 2, seen from above and from the side.
Figure 5:
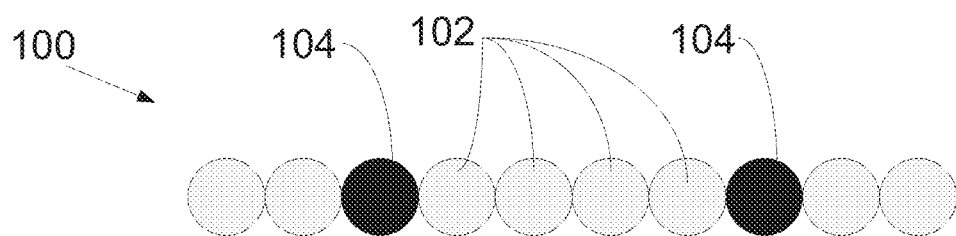
FIG. 5 shows a prior art hybrid material layer.

FIG. 4 shows some other geometric parameters of the blade. The blade has a total blade length L. As shown in FIG. 2, the root end is located at position r=0, and the tip end located at r=L. The shoulder 40 of the blade is located at a position $r=L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 metres in length, having blade root diameters of several metres. Wind turbine blades are generally designed for relatively long lifetimes and to withstand considerable structural and dynamic loading.

Figure 6:
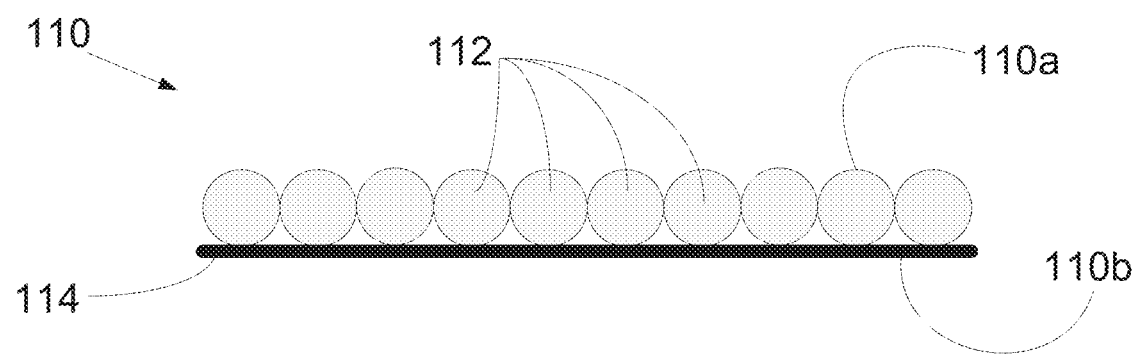
FIG. 6 shows a hybrid material mat according to a first embodiment of the invention.

With reference to FIG. 6, an embodiment of a hybrid material mat according to an embodiment of the invention is illustrated at 110. The material mat 110 comprises a plurality of glass fibre rovings 112 which are provided on a thin substrate 114 of carbon fibre. The glass fibre rovings 112 are arranged on a first side 110a of said hybrid material mat 110 and said carbon fibre substrate 114 is arranged on a second side 110b of said hybrid material mat 110. It will be understood that the hybrid material mat is preferably provided as a dry fibre mat.

By providing the carbon fibres as a thin sub-layer of material 114, upon which the glass fibre rovings 112 can be located, the mat 110 combines the advantageous properties of both glass and carbon fibres into a single material layer which is easily manufactured, while balancing the total cost of the materials used in component manufacture. Laboratory testing has shown that the above structure provides 140% compressive strength, when compared with known in-ply hybrid material mats. Furthermore, providing the glass fibres and carbon fibres as part of a single fabric layer allows for easier layup and manufacture of fibre-composite articles.

Figure 7:
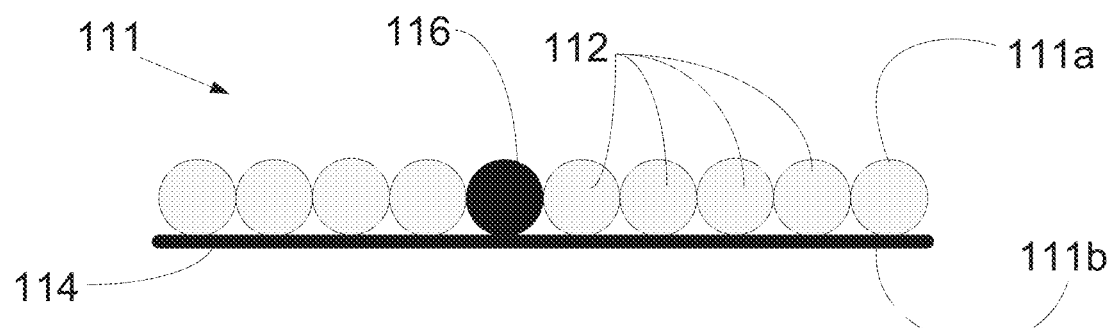
FIG. 7 shows a hybrid material mat according to a second embodiment of the invention.

With reference to FIG. 7, a further embodiment of a hybrid material mat according to the invention is illustrated at 111. In this embodiment, at least one carbon fibre tow 116 is located among the glass fibre rovings 112 of the mat 111, the carbon fibre tow 116 in conductive contact with the underlying carbon fibre substrate 114. The presence of the carbon fibre tow 116 within the sub-layer of glass fibre rovings 112 allows for potential equalisation across the mat 111, between the carbon fibre substrate 114 located on the second side 111b of the mat 111 and the exposed surface of the at least one carbon fibre tow 116 located on the first side 111a of the mat 111.

It will be understood that the at least one carbon fibre tow 116 may be evenly distributed within the sub-layer of glass fibre rovings 112. In one aspect, the ratio of carbon fibre tows to glass fibre rovings in said hybrid material mat is between approximately 1:50-1:100, preferably approximately 1:80. For example, where said rovings and tows are approximately 1 mm in diameter, for every 80 mm along the width of the mat 111, a carbon fibre tow is positioned among the glass fibre rovings.

Preferably, the glass fibre rovings 112, and possibly the carbon fibre tows 116, have a diameter of approximately 1 mm. Preferably, the carbon fibre substrate 114 has a thickness of approximately 0.1 mm.

To form the carbon fibre substrate 114, preferably at least one carbon fibre tow (not shown) is compressed or flattened to form a relatively thin sub-layer. The carbon fibre tow may be provided having a substantially circular cross-section of approximately 1-2 mm diameter, which can be compressed into a planar sub-layer having a thickness of approximately 0.1 mm and a width of approximately 30 mm. In one aspect, the at least one carbon fibre tow may be divided into a plurality of separate tow portions, and subsequently flattening or distributing said plurality of separate tow portions to form a flattened or planar substrate layer 114. The glass fibre rovings 112, and possibly at least one carbon fibre tow 116, are then attached to the carbon fibre substrate 114 using any suitable method, preferably by stitching the rovings and tows to the substrate using a stitching material.

In one aspect, the hybrid material mat 110,111 is arranged such that the mat comprises between approximately 20-40% volume carbon fibres, preferably approximately 36%.

The hybrid material mat 110,110 can then be used in the manufacture of a fibre-composite article, preferably a part for a wind turbine blade, by laying up a plurality of said mats 110,111 in a mould and infusing said plurality of mats 110,111 with a curable resin to form said article. In the case of a wind turbine blade, the hybrid material mats 110,111 may be used for the manufacture of the entire shell of a wind turbine blade, or may be used in the manufacture of component parts of such a blade, e.g. as a structural laminate or spar cap of a wind turbine blade.

In many components for outdoor use, and in wind turbine blades in particular, prevention of damage by lightning strikes is a primary concern in the manufacture and use of such components. Generally, this involves the incorporation of lightning receptors and down-conductors into the component itself, to provide a safe path through the down-conductors to ground in the event of a lightning strike on the component. However, when such components comprise conductive materials in their composition, it is extremely important that all of those materials are potentially equalised with the lightning down-conductor circuit, to prevent the possible occurrence of flash-overs or sparking in the event of a lightning strike on the component.

Figure 8:
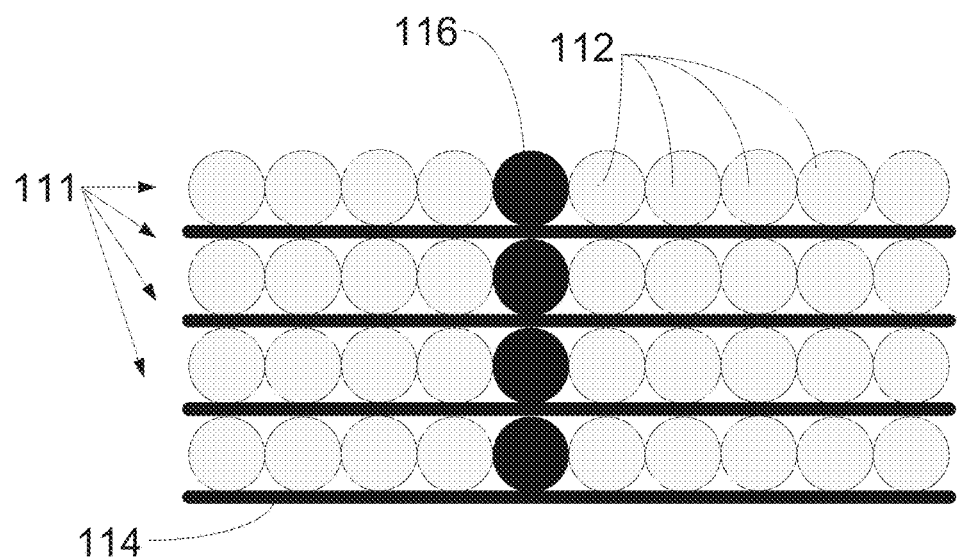
FIG. 8 shows a cross-sectional view of a stack of hybrid material mats of the embodiment of FIG. 7.

With reference to FIG. 8, a first configuration of a plurality of hybrid material mats 111 is shown, in an arrangement to facilitate potential equalisation between the individual mats 111. In this configuration, a plurality of the second embodiment of mats 111 are arranged in a stack within an article, wherein the carbon fibre tows 116 of each hybrid material mat 111 provide a conductive path between the carbon fibre substrates 114 of each mat 111, thereby ensuring that the conductive carbon fibre elements in the stack are maintained at the same electric potential. Accordingly, the base of the stack or any of the carbon substrate sub-layers may be conductively coupled to a suitable lightning protection system of the article, such that the risk of a flashover between different conductive elements of the article is reduced.

It will be understood that the arrangement shown in FIG. 8 which provides that the carbon fibre tows 116 in the stack are in vertical alignment is purely illustrative, and that the mats 111 of the stack may be arranged in any layered orientation, for example wherein the carbon fibre tows 116 are disposed in a substantially random arrangement between the carbon fibre substrates 114 of each mat 111 in the stack.

Figure 9:
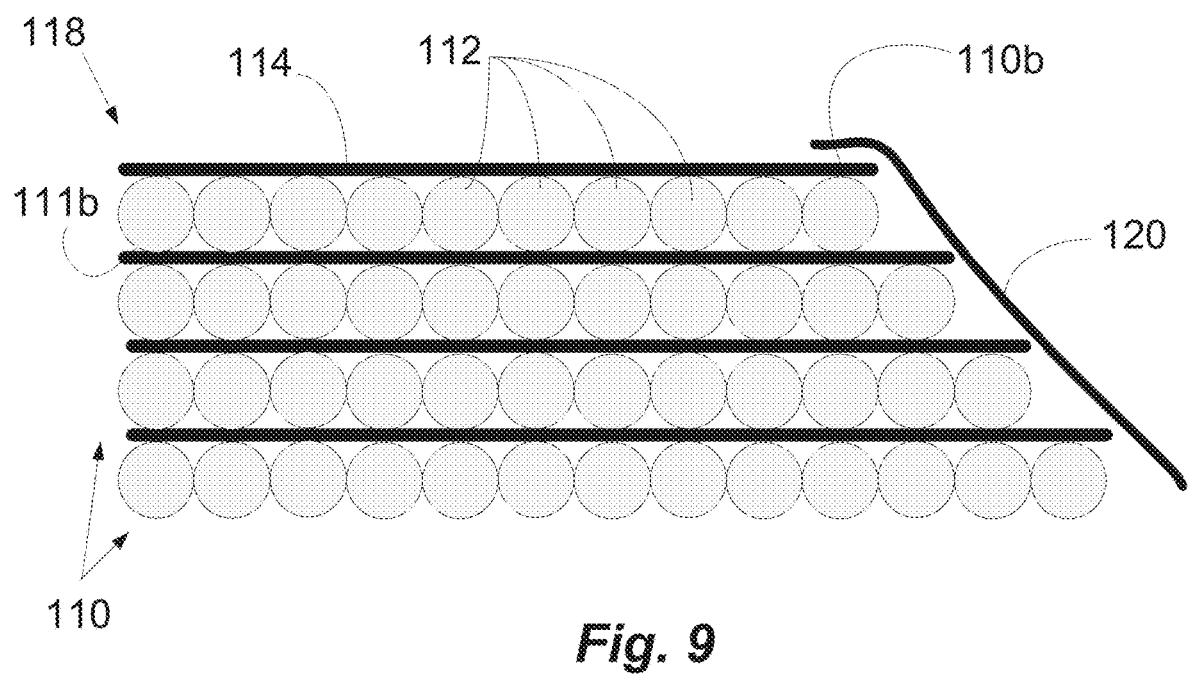
FIG. 9 shows a cross-sectional view of a stack of hybrid material mats in an arrangement for potential equalisation It will be understood that elements common to the different embodiments of the invention have been provided with the same reference numerals in the drawings.

In FIG. 9, an additional or alternative configuration of a plurality of hybrid material mats 110 is shown, in an arrangement to facilitate potential equalisation between the individual mats 110. In this arrangement, the mats 110 are a provided in a stack 118, such that the first side 110a of the mat 110 faces downwards, with the next mat 110 in the stack 118 placed on top of the second side 110b of the preceding mat 110. The mats 110 are arranged such that the edges of successive mats 110 in the stack 118 are staggered, wherein a portion of the carbon fibre substrate 114 provided on the second side 110b of each mat 110 in the stack 118 is exposed at the edge of the stack 118.

A conductive material 120 is positioned at the edge of the stack 118, such that the conductive material 120 at least partially overlies and contacts the exposed portions of the carbon fibre substrates 114 in the stack 118. In this manner, a conductive path is easily provided between the different carbon fibre substrates 114 present in the stack 118, which can then be easily connected to a suitable ground connection of a lightning protection system.

The conductive material 120 may comprise any suitable conductive element capable of establishing a conductive connection between the carbon fibre substrates 114. In one aspect, the conductive material 120 may comprise a layer of carbon fibre material draped over the edge of the stack 118, the carbon fibre material held in contact with the exposed portions of the carbon fibre substrates 114. In an alternative aspect, the conductive material may comprise a metallic element suitable for attachment or positioning at the side of the stack 118.

In FIG. 9, the mats 110 are arranged in a staircase or stepped configuration at the edge of the stack 118, but it will be understood that the mats 110 may be arranged in any suitable configuration allowing for access to the carbon fibre substrates 114 contained in the stack 118. Furthermore, it will be understood that the arrangement of mats 110 shown in FIG. 9 may be used in addition to the configuration shown in FIG. 8 with the mats 111 of the second embodiment of the invention.

It will be understood that the term rovings in the above description may be used to refer to single fibre rovings, or bundles of fibre rovings. A single roving may be understood to be a bundle of individual fibres. Where bundles of fibre rovings are used, it will be understood that the individual rovings of the roving bundle may have different dimensions dependent on material used, e.g. approximately 0.02 mm for glass fibre rovings and approximately 0.008 mm for carbon fibre rovings.

The use of the hybrid material mats 110,111 according to the invention provides for the manufacture of fibre-composite articles, and in particular wind turbine blades, having improved structural qualities combined with manageable component cost. Furthermore, the particular construction of the mats 110,111 provides for ease of manufacture of the mats themselves, as well as improved ease of handling of the mats during manufacture of articles comprising said mats. In addition, the mat construction can allow for simple and effective potential equalisation techniques to improve the lightning protection qualities of the finished article.

The invention is not limited to the embodiment described herein, and may be modified or adapted without departing from the scope of the present invention.

The invention claimed is:

1. A method of manufacturing at least a part of a wind turbine blade, the method comprising the steps of:
   providing a plurality of individual hybrid material mats, wherein each said individual hybrid material mat comprises a plurality of glass fibre rovings provided on a carbon fibre substrate, the carbon fibre substrate consisting essentially of carbon fibres, said plurality of glass fibre rovings arranged in a first layer on a first side of said individual hybrid material mat, and said carbon fibre substrate arranged in a second layer on a second side of said individual hybrid material mat, the first layer of said individual hybrid material mat having at least one carbon fibre tow positioned among said plurality of glass fibre rovings on said carbon fibre substrate within the first layer, wherein said at least one carbon fibre tow provides for a potential equalization between said first side and said second side of said individual hybrid material mat, and wherein said at least one carbon fibre tow extends along a longitudinal direction, and each of the glass fibre rovings extends along the longitudinal direction such that each of the glass fibre rovings extends parallel to the at least one carbon fibre tow;

arranging the plurality of individual hybrid material mats in a mould, wherein the plurality of individual hybrid material mats at least partially overlap in a stack in the mould such that the stack forms alternating first and second layers of adjacent ones of the individual hybrid material mats, wherein the at least one carbon fibre tow of each said first layer is positioned between the carbon fibre substrates of respective second layers of adjacent ones of the individual hybrid material mats to provide potential equalization across the stack;

infusing said plurality of individual hybrid material mats with a resin; and curing said resin to form at least a part of a wind turbine blade.

2. The method of claim 1, wherein each said individual hybrid material mat is provided as a dry fibre mat.

3. The method of claim 1, wherein said at least one carbon fibre tow is positioned among said plurality of glass fibre rovings, such that the ratio of carbon fibre tows to glass fibre rovings in said hybrid material mat is between approximately 1:50-1:100.

4. The method of claim 1, wherein said step of arranging comprises:

positioning said plurality of individual hybrid material mats in said mould, wherein each said first side of each said individual hybrid material mat is arranged face-down in the mould;

arranging said stack of at least partially overlapping individual hybrid material mats wherein, at an edge of said stack, end points of the plurality of individual hybrid material mats in said stack are staggered such that at least a portion of said second side of each of the individual hybrid material mats in said stack is exposed; and positioning a conductive material at an edge of said stack, said conductive material extending between exposed portions of said plurality of individual hybrid material mats in said stack, such that said conductive material provides a potential equalization between said plurality of individual hybrid material mats in said stack.

5. The method of claim 4, wherein said conductive material is provided as at least one layer of carbon fibre material.

6. The method of claim 1, wherein said step of providing the plurality of individual hybrid material mats comprises providing the plurality of individual hybrid material mats as respective flexible material layers.

7. The method of claim 1, wherein said step of providing the plurality of individual hybrid material mats comprises arranging said plurality of glass fibre rovings as a series of parallel longitudinally-extending rovings positioned on top of said carbon fibre substrate, and wherein said carbon fibre substrate comprises a sub-layer of longitudinally-extending carbon fibres.

8. The method of claim 1, wherein said step of providing the plurality of individual hybrid material mats comprises providing a stitching material, said plurality of glass fibre rovings stitched to said carbon fibre substrate using said stitching material.

9. The method of claim 1, wherein each said individual hybrid material mat is provided with a primary fibre orientation, and wherein said step of arranging said plurality of individual hybrid material mats in said mould comprises aligning the plurality of individual hybrid material mats such that the primary fibre orientation of said plurality of individual hybrid material mats is substantially parallel with the longitudinal direction of said at least a part of a wind turbine blade.

10. The method of claim 3, wherein the ratio of carbon fibre tows to glass fibre rovings in each said individual hybrid material mat is approximately 1:80.

11. The method of claim 6, wherein the thickness ratio of the carbon fibre substrate to the plurality of glass fibre rovings is approximately 1:10.

12. A method of manufacturing at least a part of a wind turbine blade, the method comprising the steps of:

providing a plurality of individual hybrid material mats, wherein each said individual hybrid material mat comprises a plurality of parallel longitudinally-extending glass fibre rovings provided on a carbon fibre substrate consisting essentially of longitudinally-extending carbon fibres, said longitudinally-extending carbon fibres extending parallel to the longitudinally-extending glass fibre rovings, said plurality of parallel longitudinally-extending glass fibre rovings arranged in a first layer on a first side of said individual hybrid material mat, and said carbon fibre substrate arranged in a second layer on a second side of said individual hybrid material mat, the first layer of said individual hybrid material mat having at least one carbon fibre tow positioned among said plurality of parallel longitudinally-extending glass fibre rovings on said carbon fibre substrate, wherein said at least one carbon fibre tow provides for a potential equalization between said first side and said second side of said individual hybrid material mat, wherein the at least one carbon fibre tow of each said first layer is positioned between the carbon fibre substrates of respective second layers of adjacent ones of the individual hybrid material mats;

arranging the plurality of individual hybrid material mats in a mould, wherein the plurality of individual hybrid material mats at least partially overlap in a stack in the mould such that the stack forms alternating first and second layers of adjacent ones of the individual hybrid material mats;

infusing said plurality of individual hybrid material mats with a resin; and curing said resin to form at least a part of a wind turbine blade.

* * * * *